United States Patent [19]
Vandervort

[11] Patent Number: 6,082,092
[45] Date of Patent: Jul. 4, 2000

[54] COMBUSTION DYNAMICS CONTROL FOR VARIABLE FUEL GAS COMPOSITION AND TEMPERATURE BASED ON GAS CONTROL VALVE FEEDBACK

[75] Inventor: Christian L. Vandervort, Voorheesville, N.Y.

[73] Assignee: General Electric Co., Schenectady, N.Y.

[21] Appl. No.: 09/057,268

[22] Filed: Apr. 8, 1998

[51] Int. Cl.[7] ........................................................ F02C 9/00
[52] U.S. Cl. ........................ 60/39.03; 60/39.281; 60/736
[58] Field of Search ............................... 60/39.03, 39.06, 60/39.281, 736

[56] References Cited

U.S. PATENT DOCUMENTS

| | | | |
|---|---|---|---|
| 4,735,052 | 4/1988 | Maeda et al. ............................. | 60/733 |
| 4,993,221 | 2/1991 | Idelchik .................................. | 60/39.03 |
| 5,423,175 | 6/1995 | Beebe et al. ........................... | 60/39.281 |
| 5,487,265 | 1/1996 | Rajamani et al. ..................... | 60/39.03 |
| 5,845,481 | 4/1988 | Briesch et al. .......................... | 60/39.06 |

*Primary Examiner*—Charles G. Freay
*Attorney, Agent, or Firm*—Nixon & Vanderhye

[57] ABSTRACT

An actual Wobbe Index is calculated for a turbine and compared to a reference Wobbe Index. By comparing the actual and reference Wobbe Indices and recognizing that the reference Wobbe Index has acceptable combustion dynamics, a measure of the combustion dynamics of the operating turbine can be obtained. To lower the possibility of combustion dynamics, causing combustor distress, a feedback signal is provided to change the temperature of the fuel gas provided the combustor. Since the Wobbe Index is a function of temperature and fuel composition, the variation in temperature can be effected to change the Wobbe Index to a reference Wobbe Index having known low combustion dynamics.

5 Claims, 2 Drawing Sheets

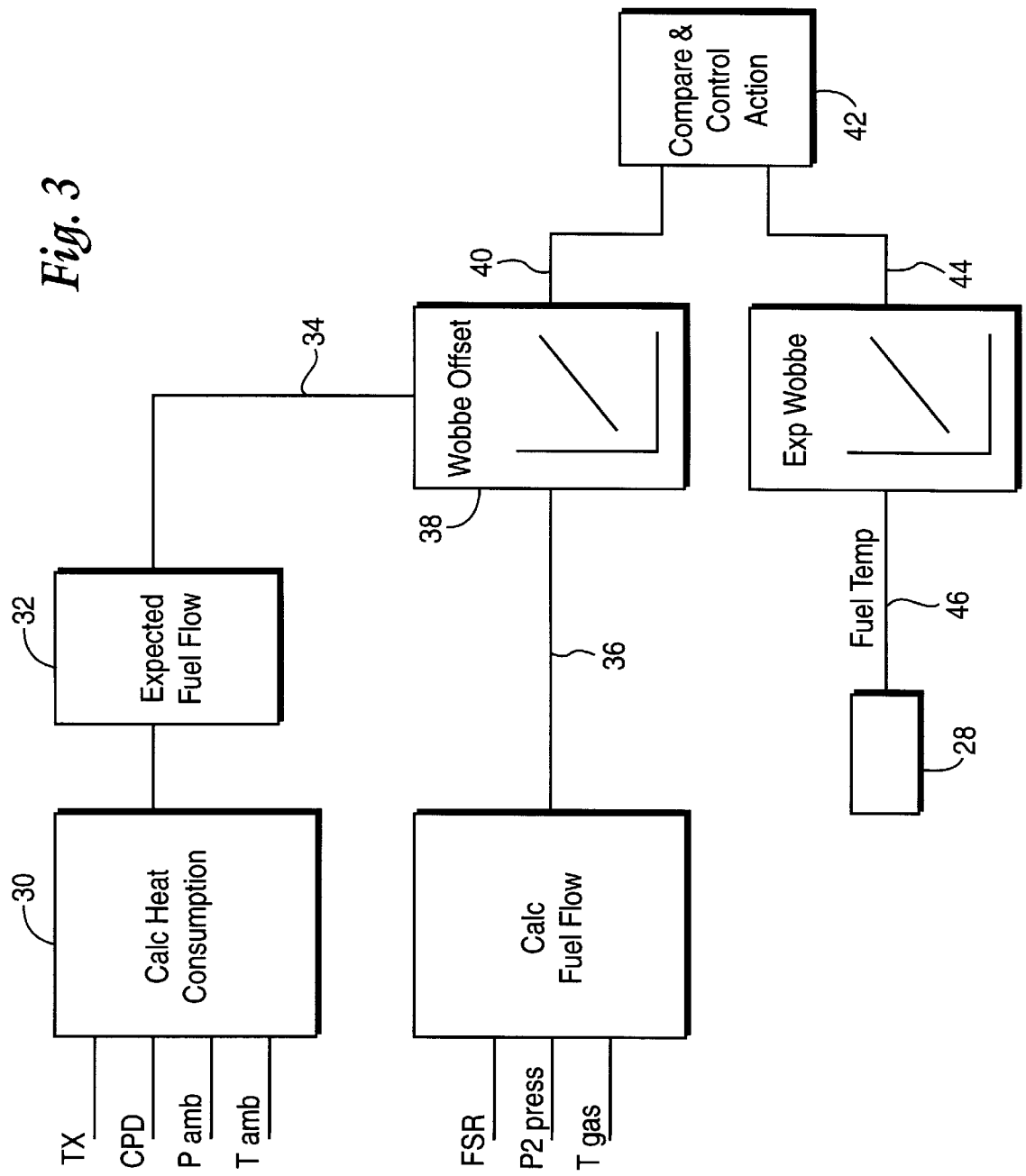

COMBUSTION DYNAMICS CONTROL FOR VARIABLE FUEL GAS COMPOSITION AND TEMPERATURE BASED ON GAS CONTROL VALVE FEEDBACK

TECHNICAL FIELD

The present invention relates to methods for controlling combustion dynamics in the combustor of a gas turbine and particularly relates to methods for controlling combustion dynamics for variable fuel gas composition and temperature based on actual calculated fuel flow to the combustor and heat input to the gas turbine.

BACKGROUND

Industrial-based turbines are often gas-fired and are typically used at power plants to drive generators and produce electrical energy. Combustion dynamics in the combustors of such turbines are defined as pressure pulsations within the combustion system caused by feedback between non-steady heat release and combustion system characteristics. Two such characteristics are chamber acoustics and the fuel delivery system. For example, in certain combustion systems, the combustor cans are cylindrical or annular and are complex structures. It is possible to excite acoustic vibrations at one or more resonant frequencies in various elements of the combustor structure. That is, the geometry of the combustors may support multiple distinct acoustic resonances when excited. Combustion dynamics at very high levels can be very destructive and may result in the forced outage of the power plant.

The problem of combustion dynamics is known and is typically controlled to acceptable levels through a number of techniques, including geometric optimization, variation of fuel introduction location and quantity, and combustor fuel nozzle pressure ratio. For example, by changing the orientation or size of various component parts of the combustor cans or supports, the combustor system can be tuned or detuned relative to the resonant frequencies of its constituent parts. Further, by splitting the fuel delivery percentages among the various fuel valves introducing fuel into the combustor, the problem of combustion dynamics can be abated. However, these solutions require setting rigid standards for fuel gas composition and temperature.

It will be appreciated that there are a number of different types of fuel gases for the combustors of turbines, including natural gas, LPG's such as propane and butane, refinery gases and coal-derived gases. The energy content of each of these fuels varies with its source and, of course, there are variations in energy content among the various types of fuels. The temperature of the fuel gas supplied to the combustor can also be quite different from system to system. For example, many power plants generating electricity from the output of gas turbines provide a fuel gas heater to provide a constant fuel gas temperature to the combustor. Other sites may have a number of boost compressors to elevate the temperature. Thus, different sites provide fuel gas at different temperatures and pressure. Furthermore, several sites source fuel gas from several different vendors which implies that both the temperature and composition of the fuel gas can vary.

The standards for setting fuel gas composition and temperature are defined by a parameter called the Wobbe Index. The Wobbe Index allows comparison of the volumetric energy content of different fuel gases at different temperatures. Since the gas turbine reacts only to energy released in the combustors and the fuel flow control process is actually a volumetric flow control process, fuels of different composition with relatively close Wobbe Indices can generally be provided in the same fuel control system. The Wobbe Index is defined most generally as the relative fuel heating value divided by the relative density. More particularly, the Wobbe Index is:

$$WI = \frac{LHV}{\sqrt{T_g \times SG}}$$

where: WI=Wobbe Index;
LHV=Lower heating value (BTU/scf);
$T_g$=Absolute temperature;
SG=Specific gravity relative to air at STP (Standard Temperature and Pressure).

Allowable variations in Wobbe number are often specified as less than ±5%. However, variations in Wobbe Index from the specified value can lead to unacceptable levels of combustion dynamics. That is, it has been determined that combustion dynamics are a function of the Wobbe Index. Consequently, operation at high levels of variations in the Wobbe Index from a specified value can result in hardware distress, reduced component life of the combustion system and a potential for power generation outage.

DISCLOSURE OF THE INVENTION

In accordance with the present invention, gas fuel control valve position feedback and machine performance parameters are used to calculate an actual gas fuel Wobbe Index. The calculated actual value is compared to an anticipated or predicted reference value based on fuel temperature and composition. An identification of an unacceptable level of combustion dynamics based on a comparison of the calculated actual and anticipated parameters can be obtained and signaled to the operator. Alternatively, an active control circuit can be provided responsive to the identification of unacceptable combustion dynamics and which control circuit would automatically vary fuel gas temperature to maintain the desired Wobbe Index.

More particularly, to determine the actual Wobbe Index for an operating turbine, the density of the fuel and heat or energy intake to the turbine are obtained. The energy input to the gas turbine can be calculated by existing algorithms resident in the turbine control system. The algorithm takes exhaust temperature, inlet guide vane angle, ambient pressure and temperature and discharge pressure into account to calculate the heat consumption which is used to generate the energy input per unit time and fuel flow. To calculate density, the mass flow of fuel is known from the calculated heat energy input to the gas turbine. The fuel flow valves are designed and operated at a critical pressure drop, which ensures that fuel flow is proportional to upstream pressure and valve position or stroke. Both upstream pressure and valve positions are available parameters in the turbine control system. Using those values as inputs, the volumetric fuel flow through each valve can be determined and by summing the volumetric fuel flow, the total fuel flow to the turbine can be ascertained. Once the total volumetric fuel flow is determined and recognizing mass flow from the heat input algorithm, a first parameter, i.e., a Wobbe Index value, can be calculated. Thus, the actual Wobbe Index value can be determined based on the foregoing described operational parameters of the combustor.

Based on a predetermined or referenced Wobbe Index value derived from expected fuel conditions, a comparison between the actual and anticipated Wobbe Indices can be made. If the actual Wobbe Index is outside a predetermined range thereof deemed acceptable for control of combustion dynamics, control action may be taken. An example of such action might comprise a warning alert to operators of the gas turbine or activation of a control circuit which would automatically vary the gas fuel temperature to adjust the actual Wobbe Index toward the desired Wobbe Index. That is, based on previous testing, a Wobbe Index which affords low combustion dynamics can be identified and employed as a reference value. If the actual calculated Wobbe Index is outside a predetermined range relative to this reference value, i.e., the anticipated or desired Wobbe Index, the temperature of the fuel can be altered by a feedback signal forwarded to a fuel gas heat exchanger or boost compressors to change the fuel gas temperature. A change in fuel gas temperature in an indicated direction, either higher or lower, changes the actual Wobbe Index for the combustion system. By altering the actual Wobbe Index toward a value corresponding to or within a predetermined range relative to the referenced Wobbe Index and for which reference Wobbe Index combustion dynamics is either not a problem or a tolerable problem, the combustion dynamics of the combustor can be controlled.

In a preferred embodiment according to the present invention, there is provided a method for controlling combustion dynamics in a combustor for a turbine, comprising the steps of determining volumetric flow of fuel input to the combustor, determining heat input to the turbine, generating a first parameter based on the volumetric flow of fuel to the turbine and the heat input to the turbine representing actual fuel conditions including composition and temperature of the fuel supplied to the combustor, comparing the first parameter with a second parameter based on anticipated fuel conditions and controlling the temperature of the fuel input to the combustor in accordance with the comparison of the first and second parameters to control the combustion dynamics of the combustor.

In a further preferred embodiment according to the present invention, there is provided a method for controlling combustion dynamics in a combustor for a turbine, comprising the steps of determining volumetric flow of fuel to the combustor, determining heat input to the turbine, generating a first parameter based on the volumetric flow of fuel to the turbine and the heat input to the turbine representing actual fuel conditions including composition and temperature of the fuel supplied to the combustor, comparing the first parameter with a second parameter based on anticipated fuel conditions, identifying an unacceptable level of combustion dynamics in the combustor based on the comparison of the first and second parameters and signaling the occurrence of an unacceptable level of combustion dynamics in the combustor.

In a still further preferred embodiment according to the present invention, there is provided a method for controlling combustion dynamics in a combustor of a turbine, comprising the steps of determining a Wobbe Index for an operating turbine where the Wobbe Index is in accord with the following:

$$WI = \frac{LHV}{\sqrt{T_g \times SG}}$$

where WI=the Wobbe Index, LHV=Lower heating value (BTU/scf), $T_g$=Absolute temperature and SG=Specific gravity relative to air at STP conditions, comparing the actual Wobbe Index with a reference Wobbe Index, identifying an unacceptable level of combustion dynamics in the combustor based on the comparison of the actual and reference Wobbe Indices and signaling the occurrence of an unacceptable level of combustion dynamics in the combustor.

Accordingly, it is a primary object of the present invention to provide a novel method for controlling combustion dynamics in the combustor of a gas turbine based on calculated fuel flow to the combustor.

BRIEF DESCRIPTION OF THE DRAWINGS

FIG. 3 is a schematic diagram illustrating a method of controlling combustion dynamics according to the present invention.

BEST MODE FOR CARRYING OUT THE INVENTION

Figure 1:
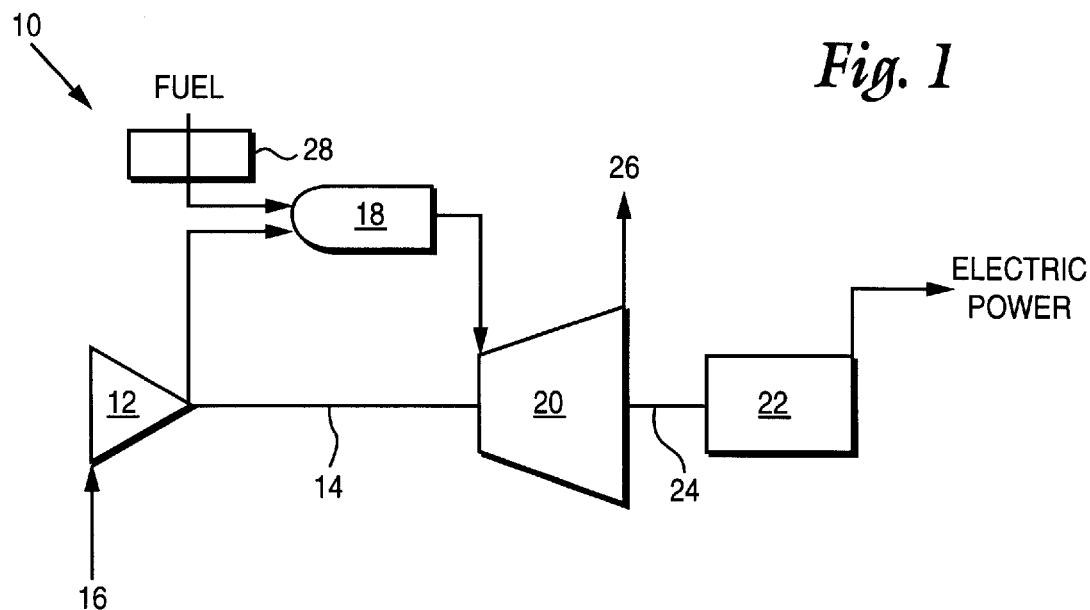
FIG. 1 is a schematic illustration of a gas turbine incorporating the present invention.

Referring now to FIG. 1, there is illustrated schematically a simple cycle, single-shaft, heavy-duty gas turbine, generally designated 10. The gas turbine comprises an axial flow compressor 12 having a rotor shaft 14. Air enters the inlet of the compressor at 16, is compressed by the axial flow compressor 12 and then is discharged to a combustor 18, where fuel such as natural gas is burned to provide high-energy combustion gases which drive the turbine 20. In the turbine 20, the energy of the hot gases is converted into work, some of which is used to drive the combustor 12 through shaft 14, with the remainder being available for useful work to drive a load such as a generator 22 by means of rotor shaft 24 for producing electricity. The heat exhaust from the turbine is illustrated at 26 and may be used for other purposes, for example, in a combined cycle system. Additionally, there is illustrated a heat exchanger 28 for heating the fuel inlet to the combustor 18 in accordance with the present invention.

Figure 2:
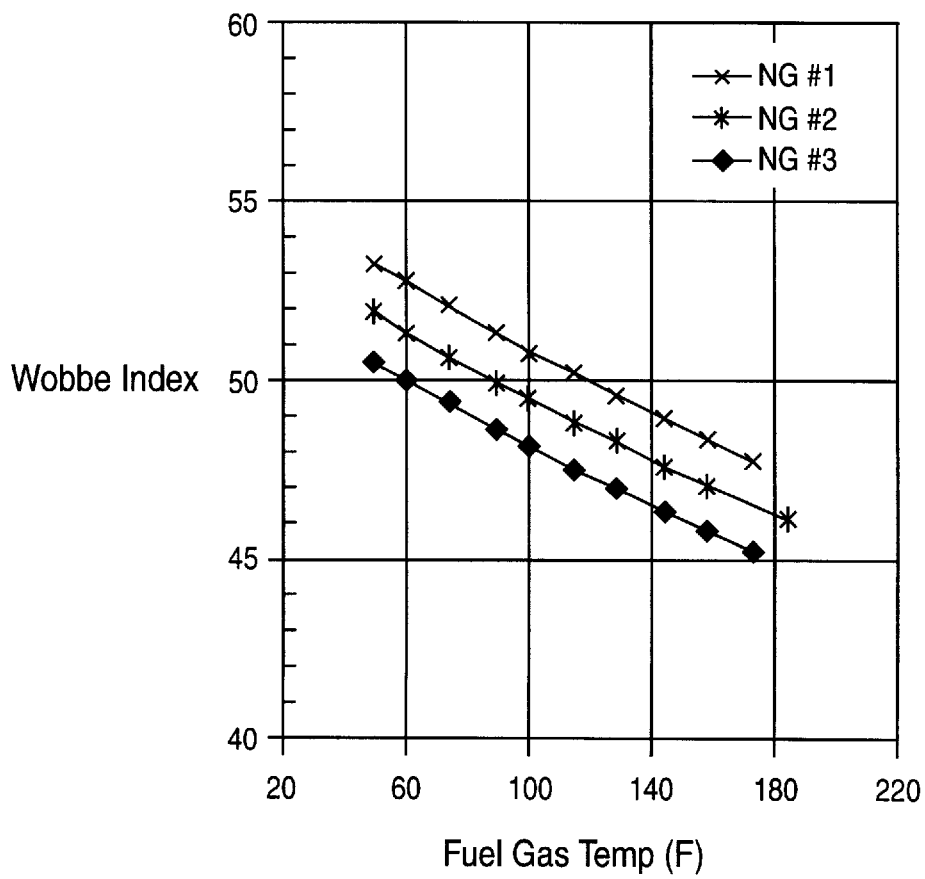
FIG. 2 is a graph illustrating the Wobbe Index as a function of fuel gas temperature.

As noted above, combustion dynamics in the combustor results from pressure pulsations caused by feedback between non-steady heat release and combustion system characteristics. Combustion dynamics, in turn, is a function of the Wobbe Index. As illustrated in FIG. 2, there is shown a representative graph giving typical variations in fuel gas composition, e.g., NG#1, NG#2, NG#3, etc. and fuel temperature as a function of the Wobbe Index. Accordingly, if an actual calculated value for the Wobbe Index for the turbine 20 can be calculated, that actual operating Wobbe Index can be compared to reference Wobbe Indices which have known combustion dynamic characteristics. Thus, by calculating the actual Wobbe Index for the operating turbine and comparing it to a reference value, i.e., a Wobbe Index of known low combustion dynamics characteristics, a measure of the combustion dynamics of the actual operating turbine 20 can be ascertained and corrective action taken as necessary.

Referring to FIG. 3, computer modeling based on the exhaust temperature TX of the turbine, the compressor discharge pressure CPD, and ambient pressure and temperature, the heat consumption of the turbine and expected fuel flow can be ascertained on a theoretical or reference basis as indicated at 30 and 32, respectively. Consequently, a theoretical Wobbe Index can be ascertained at 34. In order to calculate the actual fuel flow and, hence, obtain a Wobbe Index for that fuel composition, the total fuel flow to the turbine is summed through each of the valves to the combustors. The mass flow through the turbine can be calculated, taking into account the exhaust gas temperature $T_{gas}$, the pressure within the fuel control valves, i.e., $P2_{gas}$, and fuel valve position. The calculation is simplified for constant ambient conditions to valve position versus load where valve position is indicated by a fuel stroke reference FSR. Given the mass flow and the volumetric flow as determined by the valve position, the density can be determined. With the density and the calculated heat input to the turbine determined, an actual Wobbe Index 36 can be provided.

As illustrated in FIG. 3, the actual and reference Wobbe Indices are compared at 38 to provide an error signal. The generated error signal 40 indicates a deviation of the actual Wobbe Index from the referenced Wobbe Index. At a certain magnitude of the error signal as determined in a comparator 42, the operator of the power plant may be signaled or warned that a potential combustion dynamics problem has arisen. For example, a signal 44 generated by comparator 42 may provide an audible or visual indication to the operator. Alternatively, an automatic feedback control circuit may be provided based on the error signal 44. Once the actual Wobbe Index exceeds permissible variations from the reference Wobbe Index, corrective action thus may be taken by changing the temperature of the fuel input to the combustor. As illustrated in FIG. 2, the Wobbe Index is a function of temperature and, hence, by changing the temperature of the fuel as indicated at 46, the actual Wobbe Index can be altered to a Wobbe Index which would give lower combustion dynamics than the combustion dynamics provided by the actual Wobbe Index.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling combustion dynamics in a combustor for a turbine, comprising the steps of:

determining volumetric flow of fuel input to the combustor;

determining heat input to the turbine;

generating a first parameter based on the volumetric flow of fuel to the turbine and the heat input to the turbine representing actual fuel conditions including composition and temperature of the fuel supplied to the combustor;

comparing the first parameter with a second parameter based on anticipated fuel conditions; and controlling the temperature of the fuel input to the combustor in accordance with the comparison of the first and second parameters to control the combustion dynamics of the combustor.

2. A method according to claim 1 wherein the turbine drives a compressor and including the step of generating the second parameter based at least in part on the exhaust temperature of the turbine and discharge pressure of the compressor.

3. A method for controlling combustion dynamics in a combustor for a turbine, comprising the steps of:

determining volumetric flow of fuel to the combustor;

determining heat input to the turbine;

generating a first parameter based on the volumetric flow of fuel to the turbine and the heat input to the turbine representing actual fuel conditions including composition and temperature of the fuel supplied to the combustor;

comparing the first parameter with a second parameter based on anticipated fuel conditions;

identifying an unacceptable level of combustion dynamics in the combustor based on the comparison of said first and second parameters; and signaling the occurrence of an unacceptable level of combustion dynamics in the combustor.

4. A method for controlling combustion dynamics in a combustor of a turbine, comprising the steps of:

determining a Wobbe Index for an operating turbine where the Wobbe Index is in accord with the following:

$$WI = \frac{LHV}{\sqrt{T_g \times SG}}$$

where WI=the Wobbe Index
LHV=Lower heating value (BTU/scf)
$T_g$=Absolute temperature
SG=Specific gravity relative to air at STP conditions;

comparing the actual Wobbe Index with a reference Wobbe Index;

identifying an unacceptable level of combustion dynamics in the combustor based on the comparison of the actual and reference Wobbe Indices; and signaling the occurrence of an unacceptable level of combustion dynamics in the combustor.

5. A method according to claim 4 including controlling the temperature of the fuel input to the turbine in accordance with the comparison of the actual Wobbe Index and the reference Wobbe Index to control the combustion dynamics of the combustor.

* * * * *